United States Patent
Chang et al.

(10) Patent No.: US 9,880,018 B2
(45) Date of Patent: Jan. 30, 2018

(54) COMPUTER-IMPLEMENTED METHOD FOR RECOMMENDING BOOTHS-TO-VISIT

(71) Applicants: INTERNATIONAL BUSINESS MACHINES CORPORATION, Armonk, NY (US); INDUSTRIAL TECHNOLOGY RESEARCH INSTITUTE, Chutung Township, Hsinchu County (TW)

(72) Inventors: Hung-Yang Chang, Yorktown Heights, NY (US); Li-Ju Chen, Taipei (TW); Chia-Wen Ho, Taipei (TW); Kuo-shu Luo, Hsinchu (TW); Yi-Chang Molly Wang, Hsinchu (TW)

(73) Assignees: INTERNATIONAL BUSINESS MACHINES CORPORATION, Armonk, NY (US); INDUSTRIAL TECHNOLOGY RESEARCH INSTITUTE (TW)

( * ) Notice: Subject to any disclaimer, the term of this patent is extended or adjusted under 35 U.S.C. 154(b) by 0 days.

(21) Appl. No.: 15/109,099

(22) PCT Filed: Dec. 25, 2014

(86) PCT No.: PCT/JP2014/006458
§ 371 (c)(1),
(2) Date: Jun. 29, 2016

(87) PCT Pub. No.: WO2015/102043
PCT Pub. Date: Jul. 9, 2015

(65) Prior Publication Data
US 2016/0327403 A1 Nov. 10, 2016

(30) Foreign Application Priority Data
Dec. 31, 2013 (TW) .............................. 102149415 A

(51) Int. Cl.
G06Q 50/10 (2012.01)
G01C 21/36 (2006.01)
(Continued)

(52) U.S. Cl.
CPC ... *G01C 21/3617* (2013.01); *G06F 17/30867* (2013.01); *G06Q 30/0282* (2013.01)

(58) Field of Classification Search
CPC .......... G01C 21/3617; G06F 17/30867; G06Q 30/0282
See application file for complete search history.

(56) References Cited

U.S. PATENT DOCUMENTS 6,078,928 A * 6/2000 Schnase .............. G06F 17/3087
705/26.7
6,539,393 B1 * 3/2003 Kabala .................. G01S 5/0009
(Continued)

FOREIGN PATENT DOCUMENTS

| | | | |
|---|---|---|---|
| JP | 2003044512 A | 2/2003 | |
| JP | 2005196452 A | 7/2005 | |

(Continued)

OTHER PUBLICATIONS

International Search Report and Written Opinion from PCT Application No. PCT/JP2014/006458, dated Feb. 17, 2015.
(Continued)

*Primary Examiner* — Michael J Zanelli
(74) *Attorney, Agent, or Firm* — Zilka-Kotab, P.C.

(57) ABSTRACT

Disclosed is a computer-implemented method for recommending booths-to-visit to a user. The method includes: accessing a map database of an exhibition; accessing a history database that stores a plurality of records indicative of booths visited by a previous visitor in the exhibition; accessing a user record that includes data indicative of the booths which the user has visited; determining similarity
(Continued)

level between each record in the history database and the user record, selecting one of the records according to the determined similarity level so as for the selected record to function as a reference record, usable to determine the booths not yet visited by the user; obtaining the user's current location in the exhibition, and determining a target booth, from the booths not yet visited by the user, by referring to the current location and the map database; and sending to the user a message indicative of the target booth.

25 Claims, 2 Drawing Sheets

(51) Int. Cl.
  *G06Q 30/02* (2012.01)
  *G06F 17/30* (2006.01)

(56) References Cited

U.S. PATENT DOCUMENTS

| | | | |
|---|---|---|---|
| 7,212,983 B2* | 5/2007 | Redmann | G06Q 10/02 705/6 |
| 7,856,311 B2* | 12/2010 | Matsuura | G01C 21/3679 701/424 |
| 2002/0168084 A1 | 11/2002 | Trajkovic et al. | |
| 2006/0129312 A1* | 6/2006 | Chou | G06Q 10/047 701/410 |
| 2007/0059674 A1* | 3/2007 | Takano | G09B 5/00 434/160 |
| 2007/0250372 A1* | 10/2007 | Arbouzov | G06Q 10/10 709/219 |
| 2011/0153676 A1 | 6/2011 | Wu | |

FOREIGN PATENT DOCUMENTS

| | | |
|---|---|---|
| JP | 2009193465 A | 8/2009 |
| JP | 2012073956 A | 4/2012 |

OTHER PUBLICATIONS

Tunes App, "Explorer: The American Museum of Natural History New York City Guide," by American Museum of Natural History, updated May 24, 2016, 3 pages, retrieved from https://itunes.apple.com/us/app/explorer-american-museum-natural/id381227123?mt=8.

Shinoda et al., "A Ubiquitous Activity Navigation Method by Collaborative Filtering based on Behavioral Characteristics," IPSJ SIG Technical Report, vol. 2007, No. 91, Sep. 21, 2007, pp. 87-92.

Chang et al., U.S. Appl. No. 15/799,844, filed Oct. 31, 2017.

* cited by examiner

COMPUTER-IMPLEMENTED METHOD FOR RECOMMENDING BOOTHS-TO-VISIT

BACKGROUND OF THE INVENTION

Field of the Invention

This application is based on and claims the benefit of priority from Taiwan Patent Application 102149415, filed on Dec. 31, 2013.

The present invention relates to computer-implemented methods for recommending booths-to-visit in an exhibition to a user, and more particularly, to a computer-implemented method for recommending the next booth to a current user.

The present invention further relates to recommending driving routes along roads.

Description of the Prior Art

Visitors in exhibitions and museums need assistance in finding intended booths, because exhibitions and museums are spacious enough to accommodate numerous booths, but visitors can only spend limited time visiting the booths in exhibitions and museums.

In view of this, the prior art put forth some solutions, for example, US Pub. 2011/0153676 and US Pub. 2002/0168084. For further information, refer to "Explorer. The American Museum of Natural history", a museum guide application (App) which can be downloaded from iTune Store.

SUMMARY OF THE INVENTION

A computer-implemented method for recommending booths-to-visit to a user, according to one embodiment, includes (a) accessing a map database of an exhibition, wherein the map databases stores location data of a plurality of booths in the exhibition; (b) accessing a history database, wherein the history database stores a plurality of records, and each record includes data indicative of the booths visited by a previous visitor in the exhibition; (c) accessing a user record, wherein the user record includes data indicative of the booths which the user has visited in the exhibition; (d) determining similarity level between each record in the history database and the user record, selecting one of the records according to the determined similarity level so as for the selected record to function as a reference record, and determining according to the reference record the booths not yet visited by the user; (e) obtaining the user's current location in the exhibition, and determining a target booth, from the booths not yet visited by the user, by referring to the current location and the map database; and (f) sending to the user a message indicative of the target booth.

A computer device, according to one embodiment, includes a memory comprising a plurality of computer-executable instructions for performing the foregoing method; and a processor for accessing the memory, executing the plurality of computer-executable instructions, and implementing the method.

A computer program product for recommending booths-to-visit to a user includes a computer readable storage medium having program instructions embodied therewith, the program instructions executable by a computer to cause the computer to perform the foregoing method.

A computer-implemented method for recommending driving routes to a user, according to one embodiment, includes (a) accessing a map database for a given area, wherein the map databases stores location data of a plurality of passing points in the given area; (b) accessing a history database, wherein the history database stores a plurality of records, and each record stores data indicative of passing points passed by a previous driver in the given area; (c) accessing a user record, wherein the user record includes data indicative of the passing points which the user has passed in the given area; (d) determining similarity between each record in the history database and the user record, selecting one of the records according to the determined similarity so as for the selected record to function as a reference record, and determining according to the reference record the passing points which the user has not passed; (e) obtaining the user's current location in the given area, and determining a target passing point, from the passing points which the user has not passed, by referring to the current location and the map database; and (f) sending to the user a message indicative of the target passing point.

A computer device, according to one embodiment, includes a memory comprising a plurality of computer-executable instructions for performing the foregoing method; and a processor for accessing the memory, executing the plurality of computer-executable instructions, and implementing the method.

A computer program product for recommending booths-to-visit to a user includes a computer readable storage medium having program instructions embodied therewith, the program instructions executable by a computer to cause the computer to perform the foregoing method.

BRIEF DESCRIPTION OF DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION OF THE EMBODIMENTS

Figure 1:
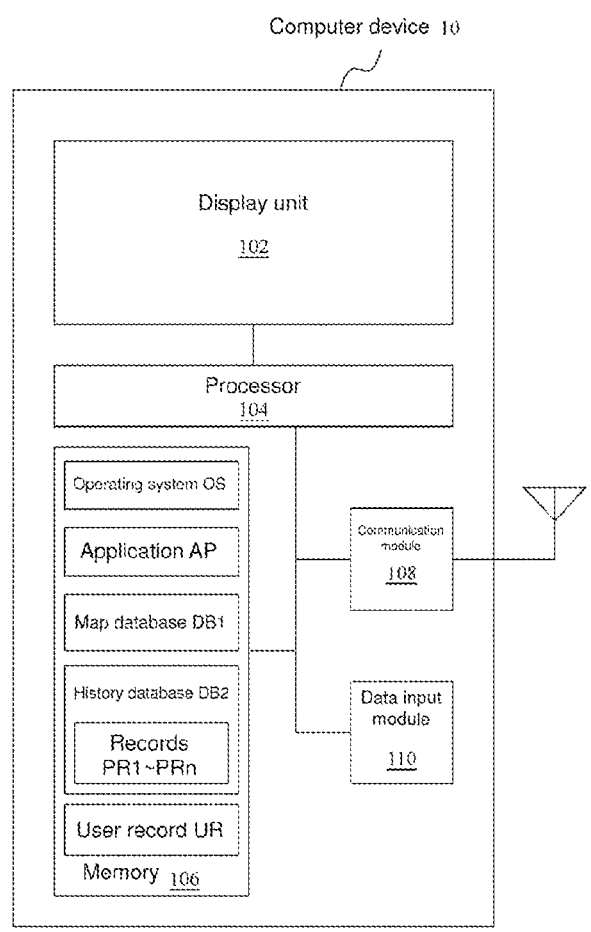
FIG. 1 is a block diagram of a computer device according to an embodiment of the present invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The present invention puts forth a way of recommending the visiting booth in a personalized manner according to user's past visiting behavior in an exhibition. Furthermore, the present invention is characterized in that, as a result of the ongoing development of user's visiting behavior in an exhibition, dynamic recommendation is effectuated by recommending a different subsequent visiting booth.

Compared with the present invention, the prior art mostly adopts static recommendation, that is, giving no consideration to user's past behavior, but providing a recommendation checklist according to invariable (i.e., time-independent) user parameters, such as a user's gender, age, and favorite theme. However, visiting behavior (which involves staying at a booth and then moving to another booth) in an exhibition is essentially embodied in a series of persistent dynamic activities and occurs in a very individual, impromptu manner. In practice, what a user needs most instantly is a recommendation of the next booth rather than a checklist of recommended booths. According to the present invention, a recommendation of the next booth at least depends on the booths previously visited by the user—a factor not considered by conventional static recommendation techniques. In particular, recommendation checklists of the prior art often cause information overload to users, not to mention that every user still has to determine the next booth on his/her own.

In view of this, the present invention, in an embodiment thereof, entails comparing a user's latest visiting records in an exhibition and complete previous visiting records attributed to the other visitors and stored in a database, identifying a previous visitor similar to the user in visiting behavior, and treating the identified previous visitor as a reference standard. Furthermore, in an embodiment of the present invention, which booth would be visited by the identified previous visitor (the reference standard) after he/she visited the booth that the user just visited is investigated, and the other criteria, such as the user's current location and preference, are taken into consideration, in order to recommend the next booth to the user.

Furthermore, in an embodiment of the present invention, users do not need to strictly follow recommendation, as the users are allowed to spend most of their time looking around casually in an exhibition, but ignoring recommendations given by a system, thereby maintaining the important individuality and extemporaneity of visiting pleasure. In an embodiment of the present invention, a recommendation of the next booth depends largely on the last booth visited by the user (or the booths which the user has visited in an exhibition), and thus the most appropriate next booth is recommended to the user according to the user's latest visiting records whenever the user needs a recommendation.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The following description, the appended claims, and the embodiments of the present invention further illustrate the features and advantages of the present invention.

As will be appreciated by one skilled in the art, the present invention may be embodied as a computer device, a method or a computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
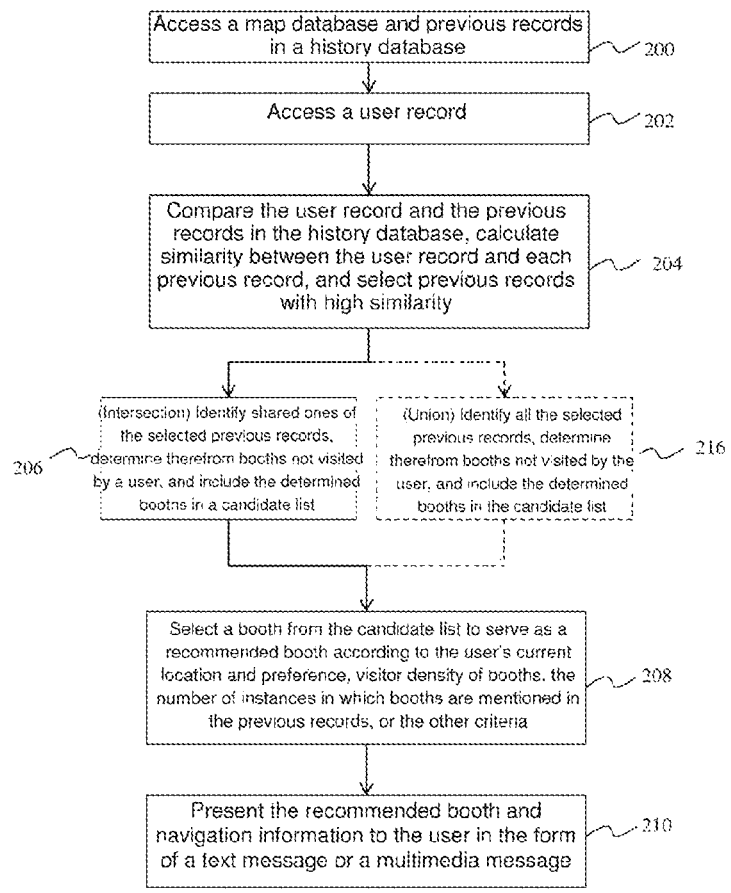
FIG. 2 is a flow chart of a method according to an embodiment of the present invention.

Referring now to FIG. 1 through FIG. 2, computer devices, methods, and computer program products are illustrated as structural or functional block diagrams or process flowcharts according to various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

<Computer Device>

FIG. 1 is a block diagram of a computer device 10 according to an embodiment of the present invention. The computer device 10 comprises a display unit 102, a processor 104, a memory 106, a communication module 108, and a data input module 110.

The computer device 10 comes in the form of a conventional notebook computer or a portable information device. Preferably, the computer device 10 is a mobile phone; for further information pertaining to its basic elements, refer to Apple's iPhone products.

For example, the processor 104 is a CPU produced by Apple or ARM and mounted on a mobile device, whereas the memory 106 is a flash memory for storing an operating system OS and computer-executable commands of applications AP, which are accessed and executed by the processor 104. For further information about the operating system OS, refer to Apple's iOS 7. The applications AP execute the steps depicted with FIG. 2 and generate or send messages to users. For related details, refer to the descriptions below.

In an illustrative embodiment not shown, the computer device 10 comes in the form of a high-level workstation or mainframe with robust processing capability and storage capability, such as IBM's System X, Blade Center, and eServer. In this embodiment, the computer device 10 sends to a user's personal terminal (such as a mobile phone or a tablet) the messages generated from the applications AP with the communication module 108 linked to a network (such as a wireless local area network (WLAN) or a 30 mobile phone network), thereby reducing greatly the requirements of the computation capability of the user's personal terminal.

In the embodiment depicted with FIG. 1, the memory 106 stores map database DB1 and history database DB2 and stores user record UR. The details of map database DB1, history database DB2, and user record UR are described later. In another embodiment, map database DB1, history database DB2, and user record UR are also disposed or stored in a cloud device (not shown) outside of the computer device 10, wherein applications AP in the computer device 10 access required data through a network and thus reduce greatly the memory space required for the memory 106. In another embodiment, map database DB1, history database DB2, and user record UR are separately disposed in the computer device 10 and one or more external cloud devices rather than disposed in the same device.

The map database DB1 stores digital map information of an exhibition, especially location data of a plurality of booths in the exhibition and basic data of each booth, such as name and theme. For the operation of map database DB1, refer to the digital storey map provided in the aforesaid museum guide application (App) "Explorer. The American Museum of Natural History" or refer to the indoor maps of Google Map. When applied to an embodiment of recommending driving routes, map database DB1 includes data pertaining to the locations of passing points (such as specific sections) along a plurality of roads and basic data of each passing point, such as names and passing rules (say, tolls or speed limits); for further details, refer to Google Map.

The history database DB2 stores a plurality of previous records PR1~PRn, wherein each record includes data indicative of the booths visited by a previous visitor in the exhibition from the beginning to the end, preferably, including, but not limited to, the sequence of the booths visited by the previous visitor and the time spent on visiting each of the booths. Referring to Table 1 below, there are 4 previous records, wherein the English letters are the codes for the booths, and the booth codes are arranged from the left to the right according to the visiting sequence. As shown in Table 1, the numeral enclosed in the brackets behind each booth code states the time (in 10 minutes) staying at the booth. Table 1 illustrates a simple example, but, in practice, history database DB2 is likely to include thousands or tens of thousands of records, with each record involving dozens of booths. Also, in another embodiment, previous records contain booth codes but do not include sequence data.

TABLE 1

| visitor | visiting booth |
|---------|----------------|
| No. 1   | A(2); B(1); C(2); D(1); E(3) |
| No. 2   | A(1); F(2) |

TABLE 1-continued

| visitor | visiting booth |
| --- | --- |
| No. 3 | B(1); F(2) |
| No. 4 | A(2); B(1); C(1); D(1); E(3); F(2) |

The amount of time a visitor spends at each booth correlates indirectly with the degree of interest the visitor has in the booth. However, to preclude errors, it is preferable to adjust the amount of time (stated in previous records) a visitor spends at each booth according to a predetermined rule. For instance, considering that there are numerous visitors in an exhibition at weekends and on holidays and thus the visitors move within a booth slowly, it is practicable to adjust the actual stay duration proportionally and thereby reveal the extent of visitors' interest in the booths accurately, but the present invention is not limited thereto.

The way of accessing previous visitor records is disclosed in the prior art; for further details, refer to Indoor Positioning System (IPS) technology, such as infrared positioning technology, Global Positioning System (GPS), Radio Frequency (RF) positioning technology, and Radio Frequency Identification (RFID) positioning technology, disclosed in US Pub. 2011/0153676, but the present invention is not limited thereto. When applied to an embodiment of recommending driving routes, the locating and accessing of previous driving records can be achieved by signals sent from a vehicular mobile phone.

User record UR is provided in the same form as previous visitor records PR1~PRn are (as shown in Table 1). Since user record UR is intended for a user in need of instant recommendations, user record UR is restricted to data pertaining to booths visited by the user in an exhibition up to the present moment, though the contents of user record UR increase with the time the user stays in the exhibition. For details of the way of accessing user record UR refer to the above description of previous visitor records.

FIG. 2 is a flow chart of a computer-implemented method for recommending booths-to-visit to a user with the computer device 10 shown in FIG. 1 according to an illustrative embodiment of the present invention.

Step 200: the computer device 10 accesses map database DB1 and history database DB2 corresponding to the map database DB1 according to a predefined setting provided by the user. In an embodiment, regarding map database DB1, the user specifies a specific exhibition or even a specific area (such as a specific storey in a museum) of a large exhibition. History database DB2 stores the aforesaid previous visitor records PR1~PRn. The user specifies a period of time (say, Nov. 1, 2013 through Nov. 30, 2013), and the computer device 10 only accesses records PR1~PRn which exist during the period of time.

Step 202: the computer device 10 accesses user record UR User record UR is updated instantly according to any changes in the activities performed by the user in the exhibition, such that in step 202 the computer device 10 must access the latest user record UR.

Step 204: the computer device 10 compares previous records PR1~PRn in history database DB2 and user record UR to therefore calculate the similarity between user record UR and each previous record PR1~PRn and further select previous records of higher similarity for use in the subsequent step. Similarity algorithms for use in calculating the similarity between two pieces of data or between several rows of data are not limited by the present invention but are well known among persons skilled in the art; for further details, refer to the similarity algorithms disclosed in US Pub. 2011/0153676; hence, the similarity algorithms are not described herein for the sake of brevity. To calculate similarity, it is feasible to assign different weights to each previous record, for example, a large weight is assigned to a recent record, or a larger weight is assigned to previous records which take recommendations from the computer device 10 than previous records which ignore recommendations from the computer device 10.

In an illustrative embodiment, user record is depicted with Table 2.

TABLE 2

| user | visiting booth |
| --- | --- |
| | A(2); B(1) |

In this simplified example, a comparison of user record of Table 2 and previous records of Table 1 reveals that records of visitor No. 1 and visitor No. 4 are similar to user record, as all including "A(2); B(1)". Hence, records of visitor No. 2 and visitor No. 3, which are not similar to user record, are ruled out, and then the process flow of the method goes to step 206.

Step 206: the shared ones (i.e., the intersection) of the records of visitor No. 1 and visitor No. 4 are identified to obtain "A(2) B(1) D(1); E(3)". Furthermore, compared with the user record (i.e., "A(2); B(1)") illustrated with Table 2, it reveals that the user has not visited booth D and booth E, and thus booth D and booth E are included in a recommended candidate list Regarding the above simplified example, in another embodiment, step 204 entails selecting three or more visitor records according to a similarity criterion, such that step 206 entails identifying the largest possible number of shared ones of the visitor records selected in step 204, identifying booths which the user has not visited from the largest possible number of shared ones of the selected visitor records, and including the identified booths in a candidate list. Then, the process flow of the method goes to step 208.

Step 208: a booth is selected from the candidate list (i.e., booth D and booth E in this embodiment) according to another criterion, and the selected booth is recommended to the user. In an embodiment, considerations are given to booth visiting sequence to therefore find that booth D precedes booth E whether in the records of visitor No. 1 or in the records of visitor No. 4, and thus booth D is regarded as the recommended booth.

In another embodiment, no considerations are given to booth visiting sequence, and the nearer one of booth D and booth E to the user's current location is regarded as the recommended booth.

In another embodiment, theme data (stored in map database DB1) of booth D and booth E is compared with a preference criterion provided by the user, such that booth D and booth E will be regarded as recommended booths if they meet the user's preference criterion.

Compared with the above embodiment in which the user takes the initiative in providing a preference criterion, another embodiment is characterized in that the user need not take the initiative in providing a preference criterion, but the system infers the user's habit, compares the user's habit with theme data (stored in map database DB1) of booth D and booth E, and regards booth D and booth E as recommended booths whenever booth D and booth E comply with the user's habit. For instance, the computer device 10 accesses information (including posts, photos, attendance card reader locations, and "liked" subjects) published by the user on a social networking website, such as Facebook, so as to infer the user's habit with a computer algorithm. For further details of the examples of the computer algorithm, refer to TF-IDF (Term Frequency-Inverse Document Frequency) technology, and refer to a way of displaying appropriate advertisements by identifying users' habits according to the contents of messages published by the users on Facebook, for example.

In an embodiment of recommending driving routes, the computer device 10 receives positioning signals from the user's vehicular mobile phone, calculates the average speed at which the user's vehicle is moving, and thus infers the user's favorite driving speed, so as to give recommendations to the user either in tolled highways or local roads without tolls.

In yet another embodiment, available visiting time is specified by the user (when, for example, the user enters his or her own available visiting time-related data into the computer device 10.) For instance, if the user has 20 minutes left only, booth D will be regarded as the recommended booth, because the records of visitor No. 1 and visitor No. 4 indicate that the visitors stay at booth D for 10 minutes and booth E for 30 minutes (i.e., longer than 20 minutes.)

In an additional embodiment, given the aforesaid technique of accessing user record UR, the computer device 10 can be informed of the locations of all the visitors present in an exhibition and thus the quantity of visitors present at each booth, such that the less-visited one of booth D and booth E is regarded as the recommended booth to therefore prevent congestion. In the situation where booths differ in area or space use, it is practicable to calculate the visitor density of each booth (i.e., number of visitors per unit area of a booth) and regard the less-crowded one of booth D and booth E as the recommended booth. In Table 1 and Table 2, the time the visitors and user spend at each booth is calculated by adjusting or normalizing their actual stay duration according to the then visitor density of each booth.

The aforesaid techniques for use in step 208 can be combined or assigned with different weights, such that a booth is selected from the candidate checklist of step 206 and recommended to the user.

Step 210 the recommended booth selected in step 208 is presented to the user by a text message or a multimedia message. Preferably, by making reference to the location of the recommended booth in map database DB1 and the user's current location, it is feasible to generate navigation data whereby the user arrives at the recommended booth quickly to visit it. In another embodiment, a message is sent to the customer service staff of the recommended booth to remind the staff to prepare for the arrival of the user.

As mentioned before, a larger weight is assigned to previous records (routes) which take recommendations from the computer device 10 than previous records (routes) which ignore recommendations from the computer device 10. Hence, the result of step 208 is an example where booth D is regarded as the recommended booth, if the user does take the recommendation and visits booth D (it is practicable to carry out the aforesaid positioning technique to determine whether the user takes the recommendation), the method depicted with FIG. 2 and carried out subsequently (for example, to the other user) will entail assigning a larger weight to the route (because booth D was previously recommended and adopted), such that the route will be recommended first; hence, when applied to another user, step 208 entails treating booth D as the recommended booth.

Optionally, step 206 is replaced with step 216. Step 216 involves identifying all the records of visitor No. 1 and visitor No. 4 (i.e., the union of the records of visitor No. 1 and visitor No. 4), so as to obtain "A(2); B(1) C(2) C(1); D(1); E(3); F(2)". Furthermore, compared with the user record illustrated with Table 2, it indicates that the user has not visited booth D, booth E, and booth F, and thus it is practicable to include booth D, booth E, and booth F in a recommended candidate list. In step 208, in addition to the aforesaid techniques, considerations are given to the number of instances in which booth D, booth E, and booth F are mentioned in previous records (inclusive of the records of visitor No. 1 and visitor No. 4) of Table 1, wherein booth F is mentioned thrice (in reference to visitor No. 2, visitor No. 3, and visitor No. 4, respectively) and thus ranks first, whereas booth D and booth E are each mentioned twice and thus rank second. If no other factors are taken into consideration, booth F can be regarded as the recommended booth. Preferably, all the other techniques are combined and assigned different weights, such that a booth is selected from the candidate checklist of step 216 and recommended. The aforesaid technique (described in step 208), which entails calculating the number of instances in which each booth on the candidate list is mentioned in the previous records of Table 1, is also applicable to the candidate list created in step 206. In another embodiment, it is unnecessary to identify the shared ones of the records of visitor No. 1 and visitor No. 4 or identify all the records of visitor No. 1 and visitor No. 4; instead, it is good enough to calculate the number of instances in which each booth mentioned in the records of visitor No. 1 and visitor No. 4 is also mentioned in the previous records of Table 1.

Although the present invention is illustrated with visits to an exhibition, persons skilled in the art can make reference to the above descriptions and thus are able to apply the present invention in recommending routes to drivers, for example, replacing the booths in the exhibition with passing points (say, specific sections) along a road.

The foregoing preferred embodiments are provided to illustrate and disclose the technical features of the present invention, and are not intended to be restrictive of the scope of the present invention. Hence, all equivalent variations or modifications made to the foregoing embodiments without departing from the spirit embodied in the disclosure of the present invention should fall within the scope of the present invention as set forth in the appended claims.

What is claimed is:

1. A computer-implemented method for recommending booths-to-visit to a user, the method comprising:
    (a) accessing a map database of an exhibition, wherein the map database stores location data of a plurality of booths in the exhibition;
    (b) accessing a history database, wherein the history database stores a plurality of records, and each record includes data indicative of the booths visited by a previous visitor in the exhibition;
    (c) accessing a user record, wherein the user record includes data indicative of the booths which the user has visited in the exhibition;
    (d) determining similarity level between each record in the history database and the user record, selecting one of the records according to the determined similarity level so as for the selected record to function as a reference record, and determining according to the reference record the booths not yet visited by the user;

(e) obtaining the user's current location in the exhibition, and determining a target booth, from the booths not yet visited by the user, by referring to the current location and the map database; and (e) sending to the user a message indicative of the target booth.

2. The method of claim 1, wherein step (b) comprises regarding a period of time specified by the user as an access criterion and accessing only a plurality of records complying with the period of time, wherein step (d) comprises determining similarity between the user record and each record complying with the period of time, selecting one of the records complying with the period of time according to the determined similarity, and regarding the selected record as the reference record.

3. The method of claim 1, wherein step (e) comprises obtaining a number of current visitors for each of the booths not visited by the user and determining the target booths according to the number of current visitors.

4. The method of claim 1, wherein step (e) comprises obtaining a distribution density of visitors for each of the booths not visited by the user and determining the target booths according to the distribution density of visitors.

5. The method of claim 1, wherein, in step (a), the map database further records theme data of each of the booths, wherein step (e) comprises obtaining a preference criterion entered by the user or a user habit inferred from a computer algorithm, and screening theme data of the booths not visited by the user according to one of the preference criterion and the user habit, so as to determine the target booth.

6. The method of claim 1, wherein, in step (b), each record further includes data indicative of a sequence of booths visited by the previous visitor; wherein, in step (c), the user record further includes data indicative of a sequence of booths visited by the user; and wherein, in step (d), data included in the user record to indicate a sequence of booths visited by the user and data included in the reference record to indicate a sequence of booths visited by the previous visitor are identical when referring to the same booths.

7. The method of claim 1, wherein step (d) comprises selecting a plurality of reference records from the plurality of records according to the determined similarity, identifying shared ones of the reference records, and identifying booths not visited by the user but included in the shared reference records, and step (e) comprises determining the target booth from the booths not visited by the user but included in the shared reference records.

8. The method of claim 1, wherein step (d) comprises selecting a plurality of reference records from the plurality of records according to the determined similarity, identifying all the reference records, and identifying booths not visited by the user but included in all said identified reference records, and step (e) comprises, for each of the booths not visited by the user but included in all said identified reference records, calculating how many instances in which the booth is mentioned in the plurality of records, sorting the booths not visited by the user according to the calculation, and determining the target booth.

9. The method of claim 1, wherein step (e) comprises for each of the booths not visited by the user, calculating how many instances in which the booth is mentioned in the plurality of records.

10. The method of claim 1, wherein, in step (b), each record further includes data indicative of time spent by the previous visitor at each visited booth; wherein, in step (c), the user record further includes data indicative of time spent by the user at each visited booth; and wherein, in step (d), data included in the user record to indicate the time spent by the user at each visited booth and data included in the reference record to indicate the time spent by the previous visitor at each visited booth are identical when referring to the same booth.

11. The method of claim 10, wherein, in step (b), the time spent by the previous visitor at each visited booth and indicated by each record is calculated by adjusting or normalizing the time actually spent by the previous visitor at each visited booth according to a visitor density of each visited booth when visited by the previous visitor, wherein, in step (c), the time spent by the user at each visited booth and indicated by the user record is calculated by adjusting or normalizing the time actually spent by the user at each visited booth according to the visitor density of each visited booth when visited by the user.

12. The method of claim 10, wherein step (e) comprises accessing available visiting time specified by the user and determining the target booth according to the available visiting time.

13. The method of claim 12, wherein, in step (e), a number of booths which the user expects to visit is provided by the user, and the number is obtained, such that the target booth is determined according to the number.

14. A computer device, comprising:
a memory comprising a plurality of computer-executable instructions for performing the method of claim 1; and
a processor for accessing the memory, executing the plurality of computer-executable instructions, and implementing the method.

15. A computer-implemented method for recommending driving routes to a user, the method comprising:
(a) accessing a map database for a given area, wherein the map database stores location data
of a plurality of passing points in the given area;
(b) accessing a history database, wherein the history database stores a plurality of records, and each record stores data indicative of passing points passed by a previous driver in the given area;
(c) accessing a user record, wherein the user record includes data indicative of the passing points which the user has passed in the given area,
(d) determining similarity between each record in the history database and the user record, selecting one of the records according to the determined similarity so as for the selected record to function as a reference record, and determining according to the reference record the passing points which the user has not passed;
(e) obtaining the user's current location in the given area, and determining a target passing point, from the passing points which the user has not passed, by referring to the current location and the map database; and
(f) sending to the user a message indicative of the target passing point.

16. The method of claim 15, wherein, in step (a), the map database stores data of each said passing point, and wherein step (e) comprises obtaining a preference criterion entered by the user or a user habit inferred with a computer algorithm, screening data pertaining to the passing points which the user has not passed according to the preference criterion or the user habit, and determining the target passing point.

17. A computer device, comprising:
a memory comprising a plurality of computer-executable instructions for performing the method of claim 14; and
a processor for accessing the memory, executing the plurality of computer-executable instructions, and implementing the method.

18. A computer program product for recommending booths-to-visit to a user, the computer program product comprising a non-transitory computer readable medium having program instructions embodied therewith, the program instructions executable by a computer to cause the computer to:
(a) access, by the computer, a map database of an exhibition, wherein the map database stores location data of a plurality of booths in the exhibition;
(b) access, by the computer, a history database, wherein the history database stores a plurality of records, and each record includes data indicative of the booths visited by a previous visitor in the exhibition;
(c) access, by the computer, a user record, wherein the user record includes data indicative of the booths which the user has visited in the exhibition;
(d) determine, by the computer, similarity level between each record in the history database and the user record, select one of the records according to the determined similarity level so as for the selected record to function as a reference record, and determine according to the reference record the booths not yet visited by the user;
(e) obtain, by the computer, the user's current location in the exhibition, and determine a target booth, from the booths not yet visited by the user, by referring to the current location and the map database; and
(f) send, by the computer, to the user a message indicative of the target booth.

19. The computer program product of claim 18, wherein accessing the history database comprises regarding a period of time specified by the user as an access criterion and accessing only a plurality of records complying with the period of time, wherein determining the similarity level comprises determining similarity between the user record and each record complying with the period of time, selecting one of the records complying with the period of time according to the determined similarity, and regarding the selected record as the reference record.

20. The computer program product of claim 18, wherein obtaining the user's current location comprises obtaining a number of current visitors for each of the booths not visited by the user, and wherein the target booth is also determined according to the number of current visitors.

21. The computer program product of claim 18, wherein obtaining the user's current location comprises obtaining a distribution density of visitors for each of the booths not visited by the user, and wherein the target booth is also determined according to the distribution density of visitors.

22. The computer program product of claim 18, wherein the map database further records theme data of each of the booths, wherein obtaining the user's current location comprises obtaining information selected from a group consisting of: a preference criterion entered by the user and a user habit inferred from a computer algorithm, and wherein determining the target booth comprises screening theme data of the booths not visited by the user according to one of the information.

23. The computer program product of claim 18, wherein each record in the history database further includes data indicative of a sequence of booths visited by the previous visitor; wherein the user record further includes data indicative of a sequence of booths visited by the user; and wherein data included in the user record to indicate a sequence of booths visited by the user and data included in the reference record to indicate a sequence of booths visited by the previous visitor are identical when referring to the same booths.

24. A computer program product for recommending driving routes to a user, the computer program product comprising a non-transitory computer readable medium having program instructions embodied therewith, the program instructions executable by a computer to cause the computer to:
(a) access, by the computer, a map database for a given area, wherein the map database stores location data of a plurality of passing points in the given area;
(b) access, by the computer, a history database, wherein the history database stores a plurality of records, and each record stores data indicative of passing points passed by a previous driver in the given area;
(c) access, by the computer, a user record, wherein the user record includes data indicative of the passing points which the user has passed in the given area;
(d) determine, by the computer, similarity between each record in the history database and the user record, select one of the records according to the determined similarity so as for the selected record to function as a reference record, and determine according to the reference record the passing points which the user has not passed;
(e) obtain, by the computer, the user's current location in the given area, and determine a target passing point, from the passing points which the user has not passed, by referring to the current location and the map database; and
(f) send, by the computer, to the user a message indicative of the target passing point.

25. The computer program product of claim 24, wherein the map database stores data of each said passing point, and wherein obtaining the user's current location comprises obtaining information selected from a group consisting of: a preference criterion entered by the user and a user habit inferred with a computer algorithm, and wherein the target booth comprises screening data pertaining to the passing points which the user has not passed according to the information.

* * * * *